Figure 1:
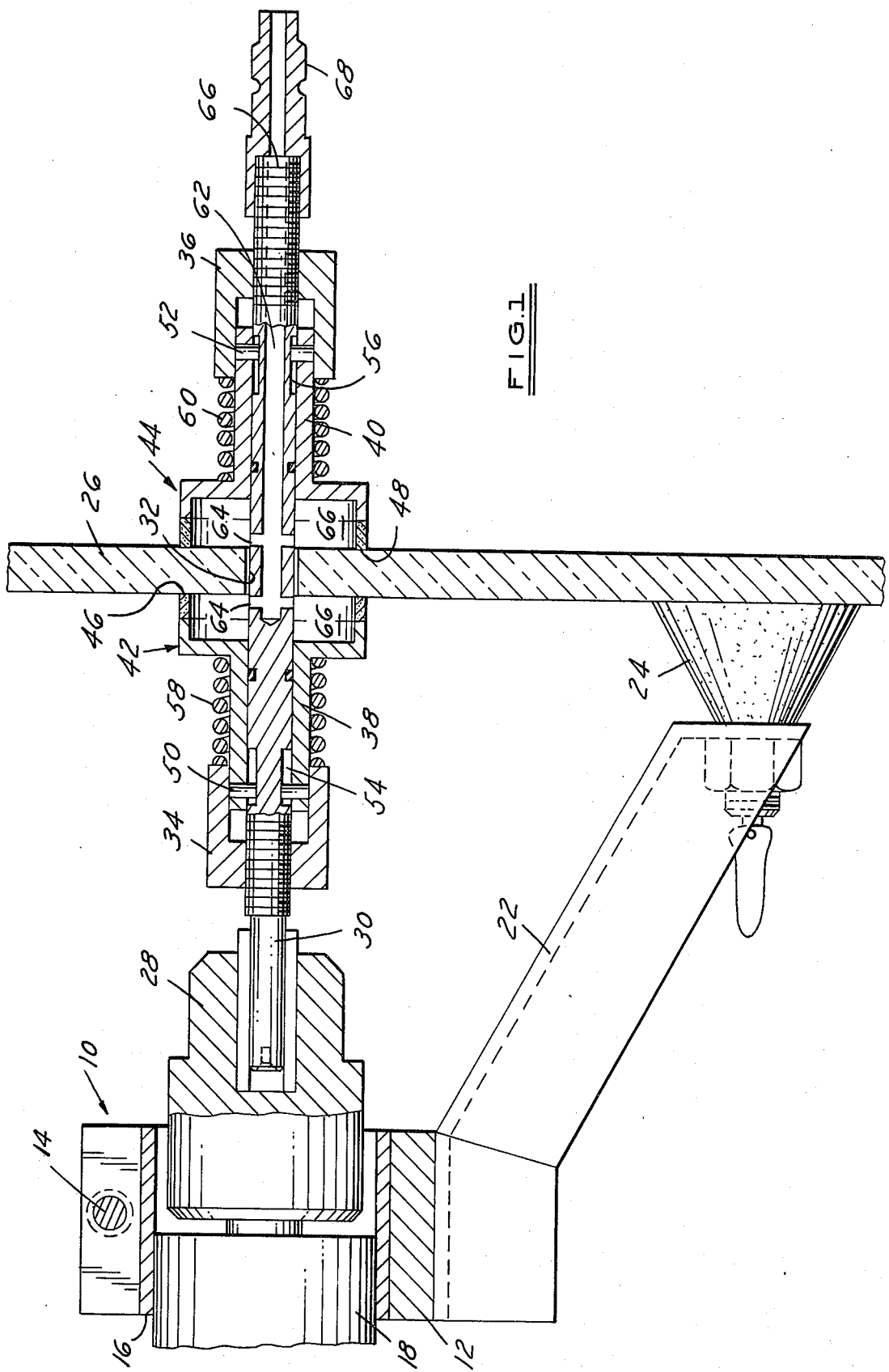

United States Patent [19]

Giardini

[11] 4,380,990

[45] Apr. 26, 1983

[54] PORTABLE CORE DRILL CUTTER FOR HARD BRITTLE SHEETS

[75] Inventor: Dante S. Giardini, Dearborn Heights, Mich.

[73] Assignee: Ford Motor Company, Dearborn, Mich.

[21] Appl. No.: 819,904

[22] Filed: Jul. 28, 1977

[51] Int. Cl.³ .................... B23B 35/00; B23B 41/00; B28D 1/02

[52] U.S. Cl. .................................. 125/20; 51/81 R; 51/111 R; 51/283 R; 408/41; 408/60; 408/94; 408/145; 408/119; 408/204

[58] Field of Search ............... 408/37, 41, 118, 119, 408/27, 145, 1 R, 93, 94, 60, 204; 51/81 R, 111 R, 283 R; 125/20

[56] References Cited

U.S. PATENT DOCUMENTS

| | | | |
|---|---|---|---|
| 2,081,487 | 5/1937 | Lane | 408/60 |
| 2,941,338 | 6/1960 | Santschi | 51/81 R |
| 3,007,686 | 11/1961 | Pearson | 125/20 X |
| 3,527,275 | 9/1970 | Koehler | 408/118 |

FOREIGN PATENT DOCUMENTS 997659 7/1965 United Kingdom ............ 51/111 R

*Primary Examiner*—Z. R. Bilinsky
*Attorney, Agent, or Firm*—Robert E. McCollum; Clifford L. Sadler

[57] ABSTRACT

A portable lightweight drill assembly is mounted against one side of a sheet of flat glass having a hole or crack to be repaired; the drill shaft extends through the hole or crack to mount cutters on both sides; the cutters are spring biased against the glass to exert equal cutting force and simultaneously rotatable with the drill shaft to cut the hole from both sides to a diameter larger than the hole to be repaired, for insertion of a glass repair plug.

14 Claims, 3 Drawing Figures

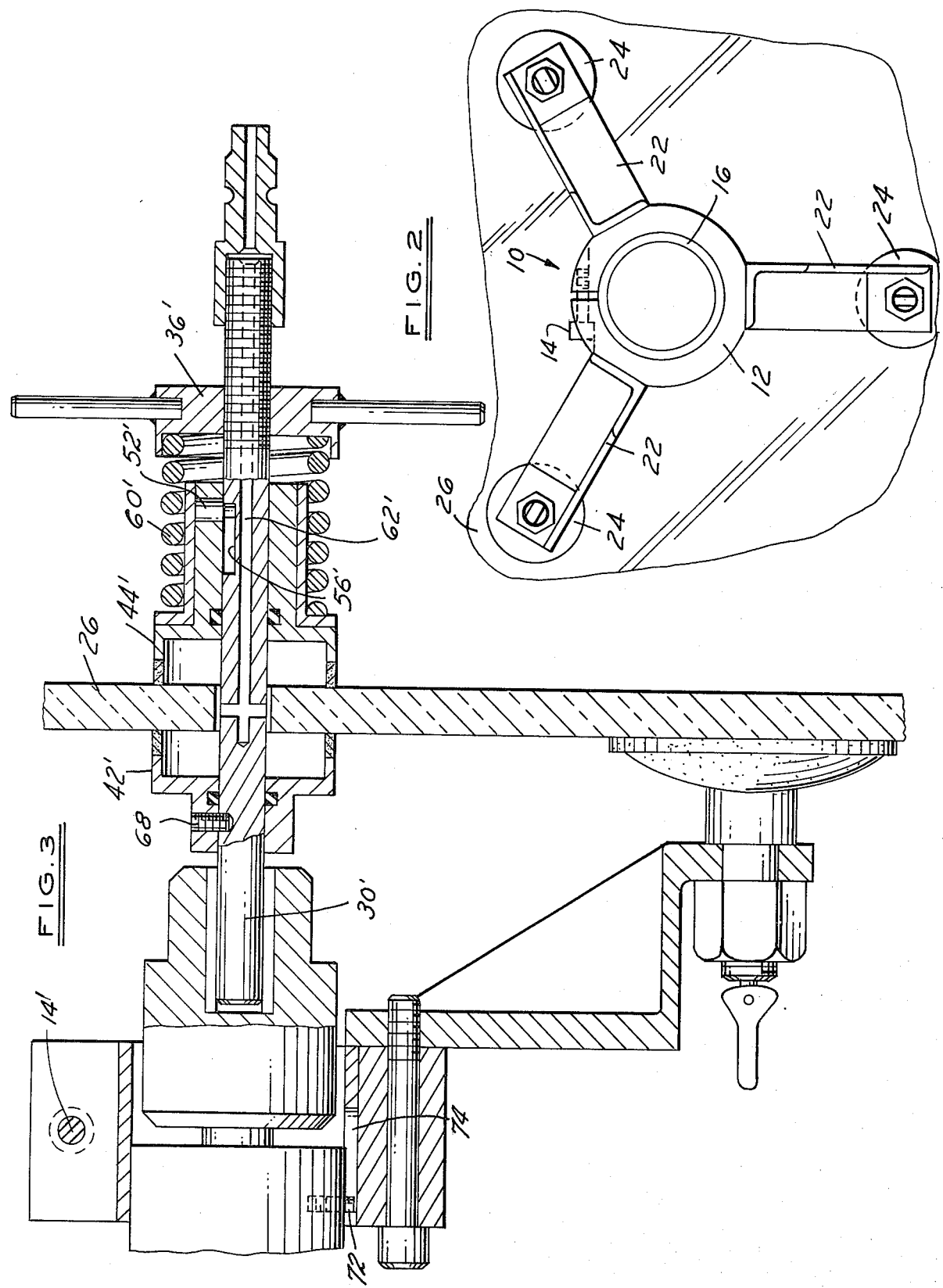

PORTABLE CORE DRILL CUTTER FOR HARD BRITTLE SHEETS

This invention relates in general to the art of repairing holes or small cracks in hard brittle glass sheets, such as plate glass or the like. More particularly, it relates to a low speed portable core drill fixture or assembly that can repair a hole or crack in a sheet of plate glass or the like without removing the glass from its installation.

Devices are known for repairing holes and cracks in plate glass. However, most frequently these devices are not portable and the glass to be repaired usually must be transported to the device itself. In the case of plate glass show windows, for example, this would be quite unsatisfactory, and usually the entire plate glass panel is replaced rather than repaired. An example of the former type of devices is shown in U.S. Pat. No. 3,813,820, Highberg et al, Sheet Glass Core Drilling Machine, and U.S. Pat. No. 3,710,516, Kelly, Method of Drilling Glass. Both of the latter show machines in which a sheet of glass is inserted between a pair of core drills and the drills are alternately moved against the glass to drill the hole from opposite sides. Cooling water is applied to the center of the core to remove the core grit. It is not practical to drill the hole from one side only because the surface opposite the drill will spall just prior to breakthrough.

U.S. Pat. No. 2,151,205, Hawn, Ceramic Drill, describes a drill for cutting ceramic that is applied to the material by suction cups. The cutting is maintained from one side only. U.S. Pat. No. 3,986,913, Walz, Method of Repairing a Crack in a Pane of Plate Glass, describes a portable core drill for enlarging a hole in a sheet of plate glass of the like so that a glass plug can be inserted to repair the glass. In this case, a pilot hole is drilled in the glass with water for cooling and a cut is made on one side of the glass to about the half way point, then the core drill is removed to the other side of the glass and the operation repeated until the hole is completed. This is a lengthy process and requires removal and reinstallation of the drill several times.

Another known construction uses a high speed drill (2500 rpm) having a shaft extending through the hole to be repaired with a core drill mounted on the shaft on opposite sides of the glass. Water is squirted onto the cutting surfaces of the core drills and a push-pull type method of cutting is employed in which first the drill on one side will enlarge the hole followed by a backing off of this core drill from the glass and moving the core drill on the opposite side into the glass to cut that surface. The use of a high speed motor requires frequent stops to clear the swarf embedded on the drill faces, and resultantly requires as much as thirty (30) minutes to drill a hole through quarter inch plate glass, for example. Also, a chipped hole results.

It is the primary object of this invention to provide a portable, lightweight, low speed core drill assembly that can be easily attached to a sheet of plate glass or the like over the hole or crack to be repaired to quickly enlarge the same and produce a chip-free precise size hole in a short cutting time witout tool wear, for acceptance of a glass plug.

It is another object of the invention to provide such a drill assembly that can be quickly attached to the glass by detachable means such as suction cups or the like, and has a pair of core drills located on opposite sides of the glass portion to be repaired that cut simultaneously at the same speed and with the same force against the opposite glass surfaces.

Another object of the invention is to provide a portable core drill of the type described above in which the core drills are slidably mounted on the shaft, are spring biased into engagement with the glass surfaces to be cut, are interconnected with each other in a manner so that equal force is applied against the cutters; and a water flush is provided internally of the cutters so that the swarf or grit is washed outwardly to prevent the cutters from loading.

Other objects, features and advantages of the invention will become more apparent upon reference to the succeeding detailed description thereof and to the drawings illustrating the preferred embodiments thereof; wherein, FIG. 1 is a cross-sectional view of one embodiment of the invention installed against a sheet of glass to be repaired;

FIG. 2 is an end elevational view of a portion of the assembly shown in FIG. 1; and, FIG. 3 is a cross-sectional view similar to the showing of FIG. 1 and illustrating a modification of invention.

FIG. 1 shows a core drill mount assembly 10 that includes a two-piece or split collar 12 that can be clamped by bolt 14 (FIG. 2) around a sleeve 16. Sleeve 16 is press fitted to a drill motor partially indicated at 18. The drill mount assembly further includes three equally circumferentially spaced mounting legs 22 that are bolted to the collar 12 by means not shown. They extend as seen in FIG. 1 both laterally and diagonally in a dome-like shape from the collar to space it from the glass specimen to be repaired. A suction cup 24 is fixed to the end of each mounting leg 22 and detachably mounts the drill assembly onto the glass indicated at 26 to straddle the hole or opening to be repaired.

The drill motor 18 includes a chuck 28 into which is fixedly mounted a drill shaft 30. The shaft extends, as shown in FIG. 1, through a hole 32 in glass 26 that would first be drilled to accommodate the drill if the hole to be repaired is of a smaller diameter. This would occur, for example, if the hole to be repaired were caused by beebees or other shot of similar size.

As shown, a cup-shaped nut 34, 36 is threadedly secured on each end of the shaft 30. Axially slidably received within each nut is the sleeve or stem portion 38, 40 of a hollow cup shaped core drill 42, 44 having a sintered diamond cutting face 46, 48. Each stem portion 38, 40 is drilled to receive a pin 50, 52 that cooperates with and slides in a keyway slot 54, 56 cut into the drill shaft 30. The keyway and pin type connection causes the simultaneous rotation of both core drills with the drill shaft 30 but permits axial sliding movement of the core drills. A pair of linear force springs 58, 60 are seated between the core drills and the edge of the nuts 34, 36.

Drill shaft 30 further has a fluid passage 62 that extends axially through the passage as shown to open out adjacent the hole portion 32 through transverse outlet passages 64. The passages open into the cavity defined by hole 32 and chambers 66 defined within the core drills 42, 44. The end of the passage is fitted with an adapter 68 that can be connected to a source of water under pressure so that water traveling through the passage 62 will discharge through the outlets 64 and flush away the grit caused by the grinding of the glass.

Before proceeding to the operation, it should be noted that the force of springs 58 and 60 will be chosen to provide the desired pressure of the cutter faces on the glass. A satisfactory spring range has been found to be, for example, between 150 lbs. and 250 lbs. force. Preferably, the drill motor would be of the variable speed type having a half inch arbor, for example, and rotate between zero and 500–600 rpm. The low speed is essential so that the water will be able to flush away the grit and prevent loading of the core cutters.

In operation, the portable drill assembly, with the drill motor clamped in place, would be transported to the site of the glass to be repaired and a pilot hole of a diameter slightly larger than the drill shaft 30 would first be drilled if the hole is not already of such a diameter. Drill shaft 30 would be inserted through the glass with one of the core drills, nuts and spring already assembled thereto leaving only the opposite side to be assembled. The water would be connected to adapter 68 and the drill motor started at a slow rpm. The springs 58 and 60 provide equal pressures in opposite directions and therefore cause equal forces of the cutter faces of core drills 42 and 44 on the surfaces of glass 26. The core drills are rotationally locked to drill shaft 30 and therefore do not rotate relative to one another. Therefore, they will not cut against each other when the connecting web of glass is broken through.

It will thus be seen that the drill assembly provides a simultaneous cutting of both surfaces of the glass with equal pressure on opposite sides of the glass, resulting in a fast drilling of the hole. The drill chuck is rotationally locked in the mounting assembly and the cutters will slowly move into the surfaces of the glass by reason of the force of springs 58 and 60.

FIG. 3 shows a modification of the invention. In this embodiment, one of the core drills 42' is fixedly keyed at 68 to the drill shaft 30' as indicated for non-rotational, non-relative movement between the two. The other core drill 44' is axially slidably mounted and spring biased in essentially the same manner as shown in FIG. 1, the nut 36' in this case being a slightly different shape. Nut 36', however, is again threadably and adjustably secured to the drill shaft 30' for varying the preload of the spring 60'. In all other respects, the elements are similar to that shown in FIG. 1 and their description, therefore, will not be repeated.

In brief, in operation of the FIG. 3 embodiment; first the drill motor clamp 12' would be tightened to axially lock the shaft 30 in place with cutter 42' lightly engaging the glass surface, and cutter 44' engaging the opposite surface, by virtue of the sliding mount between pin 52' and slot 56' and the force of spring 60. The drill motor then is rotated at a low rpm and the initial cut made. The drill motor clamp 14' is then released enough to permit a floating axial movement of drill shaft 30, by virtue of a pin 72 moving in a keyway slot 74 to prevent relative rotation of the drill shaft and clamp. The floating action is necessary to permit cutter 42' to move, i.e., to be pulled against the glass surface under the force of spring 60'. The spring 60', of course, acts directly against the core drill 44' and also in the opposite direction against the adjusting nut 36' that is secured to core drill shaft 30'. This also loads the core drill 42' in the opposite direction to that of core drill 44' so that both core drills bear against the surfaces of glass 26 with equal cutting forces. As the glass is cut, the spring 60' continues to exert an equal force on both core drills so that a simultaneous cutting of both sides of the glass takes place. Again, water flowing through the passage 62' flushes away any grit collecting inside the cutter faces. Once the glass hole is cut, a glass plug of an appropriate size can be cemented in place.

From the foregoing, it will be seen that the invention provides a glass cutting drill assembly that can easily be transported to the work upon which repair is to be made and that a hole can be quickly drilled because of the simultaneous rotation at the same speed of cutters on opposite sides of the glass with equal force on the glass surfaces. The locking of the two cutters together prevents relative rotation between the two so that when a breakthrough of the glass is made there is no cutting of the faces upon each other. A typical example of operation of a device of this kind would be to rotate the drill motor at 200–300 rpm and provide a 200 lb. spring force with 20–30 psi water pressure. Using this, it would take approximately 30 seconds to cut a hole through a quarter inch plate glass.

While the invention has been shown and described in its preferred embodiments, it will be clear to those skilled in the art to which it pertains that many changes and modifications may be made thereto without departing from the scope of the invention.

What is claimed is:

1. A portable, lightweight drill assembly for enlarging a hole or opening in a piece of plate glass or the like, comprising, in combination, means for detachably mounting a drill motor on one side of the glass, the motor having a drill shaft extending through the glass from one side to the other through a hole of a diameter accommodating the shaft and coaxial with the opening to be enlarged, a pair of core drills facing one another one each on opposite sides of the glass and having cutter faces of a larger diameter than the hole in the glass, means operatively securing the core drills to the drill shaft for simultaneous rotation therewith, the faces of the core drills being contiguous to opposite glass surfaces, means mounting at least one of the core drills on the shaft for axial movement relative to the shaft, and spring means biasing the cutter faces of the core drills against the contiguous glass surfaces whereby operation of the drill motor effects a simultaneous rotational cutting by the pair of core drills into opposite surfaces of the glass by the simultaneous axial movement of the drills in opposite directions towards one another to provide the desired enlarged hole, and a fluid passage connected at one end to a source of fluid under pressure, the passage at its other end opening adjacent the hole in the glass to be enlarged and internal of the cutter faces for discharge from the passage radially outwardly under pressure past the cutter faces of the core drills to continuously flush grinding swarf away from the cutters and thereby minimize loading of the drills.

2. A portable, lightweight drill assembly for enlarging a hole or opening in a piece of plate glass or the like, comprising, in combination, a drill motor mounting means having a central mounting hole adapted to mount a drill therein, the mounting means having a plurality of circumferentially spaced mounting legs extending laterally therefrom in a direction beyond one end to provide a dome-like shape, means detachably securing the legs to the surface of the glass in a manner straddling the opening to be enlarged and aligning the central hole and opening in the glass, for detachably mounting a drill motor on one side of the glass, the motor having a drill shaft extending through the glass from one side to the other through a second hole of a diameter accommodating the shaft and coaxial with the opening to be enlarged, a pair of core drills facing one another one each on opposite sides of the glass and having cutter faces of a larger diameter than the hole in the glass, means operatively securing the core drills to the drill shaft for simultaneous rotation therewith, the faces of the core drills being contiguous to opposite glass surfaces, means mounting one of the core drills on the shaft for axial movement relative to the shaft, and spring means biasing the cutter faces of the core drills against the contiguous glass surfaces whereby operation of the drill motor effects a simultaneous rotational cutting by the pair of core drills into opposite surfaces of the glass by the simultaneous axial movement of the drills in opposite directions towards one another to provide the desired enlarged hole, the drill shaft having a fluid passage therethrough connected to a source of fluid under pressure, the passage opening adjacent the opening in the glass to be enlarged for discharge therefrom radially outwardly under pressure past the faces of the core drills to continuously flush grinding swarf away from the cutters and thereby minimize loading of the drills.

3. A drill assembly as in claim 1, including stop means adjustably mounted near one end of the drill shaft, the means mounting the one core drill on the shaft consisting of a keyway slot and pin operably connecting the one core drill and shaft for a sliding non-rotational movement of the core drill relative to the shaft, the spring means including a spring mounted between the one core drill and stop means.

4. A drill assembly as in claim 1, the fluid passage comprising a passage through the drill shaft opening adjacent opposite surfaces of the glass at the opening to be enlarged.

5. A drill assembly as in claim 1, the drill motor being operated at slow speeds in the range of 0–600 rpm to permit fluid under pressure to clean the cutter faces of swarf.

6. A drill assembly as in claim 2, the means removably mounting the drill assembly comprising suction cup means.

7. A drill assembly as in claim 1, the spring means comprising a spring mounted between each of the core drills and a stop means axially slidably adjustably secured to the drill shaft.

8. A drill assembly as in claim 1, the spring means comprising a spring between the one core drill and stop means that is axially adjustably fixed to the drill shaft, the other core drill being fixed to the drill shaft for a non-relative movement therebetween.

9. A portable, lightweight drill assembly for enlarging an opening in a piece of plate glass or the like, comprising, in combination, a drill motor mounting means having a central mounting hole adapted to mount a drill fixedly therein, the mounting means having a plurality of circumferentially spaced mounting legs extending laterally therefrom in a direction towards and beyond one end to provide a dome-like shape, means detachably securing the legs to the surface of the glass in a manner straddling the opening to be enlarged and aligning the central hole and opening in the glass, for detachably mounting a drill motor on one side of the glass, the motor having a drill shaft extending through the glass from one side to the other through a hole of a diameter accommodating the shaft and coaxial with the opening to be enlarged, a pair of core drills axially slidably mounted on the shaft facing one another one each on opposite sides of the glass and having cutter faces of a larger diameter than the hole in the glass, means operatively securing the core drills to the drill shaft for simultaneous rotation therewith, the faces of the core drills being contiguous to opposite glass surfaces, nut means adjustably secured to the drill shaft adjacent each core drill, spring means between each of the nut means and the adjacent core drill biasing the cutter face of each core drill against its contiguous glass surface for loading the cutter faces of the core drills against the glass surfaces whereby operation of the drill motor effects a simultaneous rotational cutting by the pair of core drills into opposite surfaces of the glass by the simultaneous axial sliding movement of the drills in opposite directions towards one another to provide the desired enlarged hole, the drill shaft having a fluid passage therethrough connected to a source of fluid under pressure, the passage openings adjacent opposite sides of the hole in the glass for discharge therefrom radially outwardly under pressure along the surfaces of the glass past the face of the core drills to continuously flush grinding swarf away from the cutter faces and thereby minimize loading of the drills.

10. A drill assembly as in claim 9, the means operatively securing the core drills to the shaft comprising a keyway slot and pin type connection.

11. Apparatus for repairing a crack in a pane of plate glass having a pilot hole therethrough comprising a single drive motor having an extended shaft, an inner cutter, an outer cutter, means for mounting said cutters on said shaft on opposite sides of said pane of glass for the simultaneous rotation of said cutters by the drive means, means for yieldably urging said cutters into cutting relation with said pane of glass to concurrently cut a section therefrom from opposite sides thereof, and means detachably supporting said motor in predetermined position upon the face of said glass in normal relation thereto.

12. A method for repairing a crack in a pane of plate glass having a pilot hole therethrough comprising supporting a single drive motor upon the pane of glass in normal relation thereto and with the shaft of the motor extending through the pilot hole, and concurrently cutting the glass from both sides thereof to remove a section therefrom.

13. A method as defined in claim 12 in which a lubricating fluid is applied to the cutting zones.

14. The method of claim 12 in which cutters are yieldably urged against both faces of the glass to cause concurrent cuts to be made therein to allow removal of the cut section of glass therefrom.

* * * * *